United States Patent [19]

Cifuentes et al.

[11] Patent Number: 5,246,972
[45] Date of Patent: Sep. 21, 1993

[54] POLISH CONTAINING HIGHLY ADSORPTIVE POLYMER

[75] Inventors: Martin E. Cifuentes, Midland; Kenneth A. Kasprzak, Saginaw; Janet M. Smith, Bay City, all of Mich.

[73] Assignee: Dow Corning Corporation, Midland, Mich.

[21] Appl. No.: 506,032

[22] Filed: Apr. 6, 1990

[51] Int. Cl.⁵ .............................................. C08J 9/42
[52] U.S. Cl. .................................. 521/54; 521/122; 521/149; 521/154
[58] Field of Search ............. 521/54, 122, 149, 154

[56] References Cited

U.S. PATENT DOCUMENTS

| | | | |
|---|---|---|---|
| 3,508,933 | 4/1970 | Yates | 106/10 |
| 3,836,371 | 9/1974 | Kokoszka | 528/34 |
| 3,890,271 | 6/1975 | Kokoszka | 528/34 |
| 4,537,914 | 8/1985 | Smith at al. | 521/122 |
| 4,690,825 | 9/1987 | Won | 424/501 |
| 4,719,040 | 1/1988 | Trass | 512/4 |
| 4,724,240 | 2/1988 | Abrutyn | 514/847 |
| 4,764,362 | 8/1988 | Barchas | 424/61 |
| 4,776,358 | 10/1988 | Korsk | 132/321 |
| 4,806,360 | 2/1989 | Leong | 424/487 |
| 4,813,976 | 3/1989 | Barchas | 51/293 |
| 4,828,542 | 5/1989 | Hermann | 604/3 |
| 4,855,127 | 8/1989 | Abrutyn | 424/411 |
| 4,855,144 | 8/1989 | Leong | 424/487 |
| 4,870,145 | 9/1989 | Chromecek | 526/217 |
| 4,873,091 | 10/1989 | Jankower | 424/489 |
| 4,880,617 | 11/1989 | Chromecek | 424/501 |
| 4,881,490 | 11/1989 | Ducharme | 119/1 |
| 4,883,021 | 11/1989 | Ducharme | 119/1 |
| 4,904,524 | 2/1990 | Yoh | 428/311.3 |

FOREIGN PATENT DOCUMENTS

| | | |
|---|---|---|
| 61701 | 10/1982 | European Pat. Off. . |
| 306236 | 3/1989 | European Pat. Off. . |
| 8702013 | 2/1988 | PCT Int'l Appl. . |

*Primary Examiner*—John Kight, III
*Assistant Examiner*—John M. Cooney, Jr.
*Attorney, Agent, or Firm*—James L. DeCesare

[57] ABSTRACT

A polish composition which includes discrete particles of a highly cross-linked macroporous hydrophobic polymer. The particles are of a first predetermined average diameter, and the polymer particles have entrapped therein and dispersed uniformly throughout an active organosilicon ingredient. The composition also includes a coacervating agent mixed with the polymer particles in an amount sufficient to cause the polymer particles to collect forming dense clusters of coacervated particles of a second predetermined average diameter, the second predetermined average diameter being substantially in excess of the first predetermined average diameter.

52 Claims, 3 Drawing Sheets

POLISH CONTAINING HIGHLY ADSORPTIVE POLYMER

BACKGROUND OF THE INVENTION

This invention relates to a polish which includes a macroporous highly cross-linked polymer. More particularly, the invention includes a polish that contains small porous polymer particles which entrap an active ingredient.

Polishes are used to produce a glossy finish on a surface as well as to prolong the useful life of the surface. The gloss provided by the polish is the result of components in the polish which leave a coating and that function to smooth and clean the surface. Floor polish, furniture polish, and shoe polish, rely upon a deposited film. Car and boat polish formulations result in a glossy and protective film and may contain abrasives for removing weathered paint and soil as well as old built-up polish. Metal polish contains ingredients for abrasive smoothing of the surface being treated and for surface cleaning, as well as components that function to remove and retard the build-up of tarnish.

Motor vehicle polish is formulated in order to remove road film and oxidized paint, and to provide a continuous glossy film which resists water and its removal by water and car wash detergents. Such vehicle polishes contain several major functional ingredients including an abrasive. The abrasive, however, must be mild enough to avoid scratching of the painted surface, and representative of such mild acting materials are, for example, fine grades of aluminum silicate, diatomaceous earth, and various silicas. Straight and branched chain aliphatic hydrocarbons are employed to facilitate the detergency of the polish against oil based traffic soils and debris, and provide the solvency characteristics necessary in the production of a stable formulation. These hydrocarbons also control the drying rate of the formulation. Wax constitutes another polish ingredient and is one of the two film forming materials in the polish. The wax is spread and leveled and produces a high luster following buffing of the surface. Blends of soft and hard wax are often employed in order to facilitate ease of buffing and the durability of the polish against environmental antagonists. Exemplary waxes are paraffin wax, microcrystalline petroleum wax, carnauba wax, candelilla vegetable wax, montan coal derived wax, and synthetic polymeric waxes such as oxidized polyethylene.

Silicone materials are included in polishes as the other film forming ingredient. Such silicone materials also function as lubricants for easing the application of the polish as well as its buffing, and act as release agents for dried abrasive. The silicone materials spread easily and provide a uniform high gloss and with it water repellency. Such materials typically are dimethylsilicones, however, aminofunctional silicone products are becoming more prevalent. The aminofunctional products result in films having increased resistance to removal from the surface by detergents and the environment believed to be the result of their ability to plate out on a painted surface and to crosslink and bond to that surface.

A car polish may also contain an emulsifier, a thickener, and a stabilizer, for the production of a homogeneous stable product of desired consistency. Such polishes may be solid in form, semisolid, presoftened, or liquid. The polish, for example, can be solvent based or an emulsion, and in either case is a liquid, semi-solid, or solid in constitution. Typically, liquid emulsions include five to twenty weight percent of an abrasive, ten to thirty-five weight percent of solvent, two to fifteen weight percent of a silicone material, and up to about five weight percent wax. In an emulsion paste formulation, the wax ingredient is increased in level from three to twenty-five weight percent.

Polish formulations containing organosilicon compounds are not new. For example, aminofunctional siloxanes have been employed in polish formulations in U.S. Pat. No. 3,508,933, issued Apr. 28, 1970. Such siloxanes can also be found in U.S. Pat. No. 3,576,779, issued Apr. 27, 1971, where water in oil and oil in water emulsion polishes are formulated. These aminofunctional silicones are also disclosed as ingredients in various polish formulations in U.S. Pat. No. 3,836,371, issued Sep. 17, 1974, and U.S. Pat. No. 4,218,250, issued Aug. 19, 1980.

The concept of producing spheres and beads of a macroporous polymer is old in the art, as well as the use of such macroporous structures for the entrapment and subsequent delivery of certain active ingredients. One example of this concept may be found in U.S. Pat. No. 4,690,825, issued Sep. 1, 1987, in which a suspension polymerization process is employed to produce beads from a monomer system including styrene and divinylbenzene. Mineral oil is entrapped "in situ" and the beads are said to possess utility in various cosmetic applications. In U.S. Pat. No. 4,719,040, issued Jan. 12, 1988, a macroporous polymer laden with perfume is incorporated into an air freshener gel. U.S. Pat. No. 4,724,240, issued Feb. 9, 1988, and European Patent No. 61,701, granted Jul. 16, 1986, relate to "in situ" entrapped emollients and moisturizers carried within macroporous beads and powders. In Example 1 of the '240 patent, a precipitation polymerization process is employed using ethylene glycol dimethacrylate and lauryl methacrylate monomers to produce a powder, whereas Example 4 of the '240 patent employs a suspension polymerization process to produce spherical beads. Various cosmetic and toiletry applications of these products are disclosed.

A macroporous polymer powder entrapping an emollient is taught in U.S. Pat. No. 4,764,362, issued Aug. 16, 1988, and in U.S. Pat. No. 4,813,976, issued Mar. 21, 1989, in which the powder is incorporated into a nail conditioning emery board. During filing of the nails, the emollient is said to be released from the powder as from a sponge in order to condition and lubricate the nails. A similar concept is taught in U.S. Pat. No. 4,776,358, issued Oct. 11, 1988, in which a dental floss includes flavor oils entrapped in certain "microsponges". Suspension polymerized macroporous polymer beads are taught in U.S. Pat. No. 4,806,360, issued Feb. 21, 1989, and in U.S. Pat. No. 4,855,144, issued Aug. 8, 1989, wherein melanin pigment is incorporated into the macroporous structure and applied to the skin and said to function as a sunscreen. Either polyunsaturated monomers or mixtures of polyunsaturated and monounsaturated monomers may be employed. Rather than entrapping the melanin pigment "in situ" in the beads, a volatile solvent is employed as a porogen and subsequently removed. The melanin pigment is "post adsorbed" into the empty macroporous structure. Similar techniques are also taught in European Patent Application Publication No. 0 306 236A2, published Mar. 3, 1989, and in Patent Cooperation Treaty International Publication No. WO 88/01164, published Feb. 25, 1988.

A reticulated polyurethane foam is disclosed in U.S. Pat. No. 4,828,542, issued May 9, 1989, having macroporous polymer particles bonded to the foam. The particles entrap a liquid soap and the foam is said to be capable of functioning as a cleaning pad. In U.S. Pat. No. 4,855,127, issued Aug. 8, 1989, and U.S. Pat. No. 4,880,617, issued Nov. 14, 1989, hydrophobic polymeric porous beads and powders are used as a free-flowing solid carrier for various pheromones, pesticides, fragrances, and chemicals entrapped therein. The free-flowing materials are produced by both precipitation and suspension polymerization processes. Hydrophilic beads are formed in U.S. Pat. No. 4,870,145, issued Sep. 26, 1989, and upon removal of a solvent used to form voids, the beads are stated to possess various utilities including their incorporation into contact lens cleaners, facial scrubs, and tile cleaners. The beads are disclosed to be particularly adsorptive of proteins and lipids. In U.S. Pat. No. 4,873,091, issued Oct. 10, 1989, resilient microbeads are formed by suspension polymerizing curable elastomers such as isoprene rubbers to produce porous rubber beads. The porous rubber beads are said to impart exceptional smoothness in topical applications. A pet litter is described in U.S. Pat. No. 4,881,490, issued Nov. 21, 1989, and in U.S. Pat. No. 4,883,021, issued Nov. 28, 1989, and in which a macromolecular polymer powder entrapping a fragrance is incorporated as an ingredient in an animal litter in order to slowly release fragrance for the purpose of combating odors.

While polishes containing silicones are old, and macroporous polymers are old, what is believed to be novel in accordance with the present invention is the new combination of a silicone in macroporous polymer as a polish.

SUMMARY OF THE INVENTION

This invention relates to a polish formulation containing as components thereof at least one component selected from the group consisting of waxes, film forming ingredients, solvents, surfactants, thickening agents, abrasives, dyes, odorants, and other ingredients normally used in making polishes. The improvement is directed to the incorporation into the polish formulation as the one component a macroporous highly crosslinked polymer. The polymer has entrapped therein an organosilicon compound. Preferably, the organosilicon compound is an amine functional siloxane, and an amine functional siloxane having at least one reactive group on silicon such as alkoxy groups and hydroxy groups. The polish may be in the form of a liquid, a paste, or the macroporous polymer may be applied alone as what is known commercially as a "dry brite" or "one rag" polish, meaning that the polish is applied to a surface and rubbed into the surface without the necessity of buffing the surface thereafter.

The invention is also directed to a method of polishing a surface by applying to the surface a polish formulation including a macroporous highly crosslinked polymer. The polymer has entrapped therein an organosilicon compound such as an amine functional siloxane, and the formulation is rubbed into the surface.

This invention further relates to a polish composition which includes discrete particles of a highly crosslinked macroporous hydrophobic or hydrophilic polymer. The particles are of a first predetermined average diameter, and the polymer particles have entrapped therein and dispersed uniformly throughout, an active ingredient. The composition also includes a coacervating agent mixed with the polymer particles in an amount sufficient to cause the polymer particles to collect forming dense clusters of coacervated particles of a second predetermined average diameter, the second predetermined average diameter being substantially in excess of the first predetermined average diameter.

More particularly, the polymer can be formed of at least one polyunsaturated monomer, and the polyunsaturated monomer is one of ethylene glycol dimethacrylate and tetraethylene glycol dimethacrylate. The polymer can also be formed of and include with a polyunsaturated monomer at least one monounsaturated monomer, and in this embodiment, the monounsaturated monomer is one of lauryl methacrylate and 2-ethylhexyl methacrylate.

The particles of the first predetermined average diameter can be in the form of a bead, and the bead has an average diameter of about ten microns to about one hundred-fifty microns. Alternatively, the particles of the first predetermined average diameter can be in the form of a powder and the powder is a combined system of particles, the system of powder particles including unit particles of less than about one micron in average diameter, agglomerates of fused unit particles of sizes in the range of about twenty to eighty microns in average diameter, and aggregates of clusters of fused agglomerates of sizes in the range of about two-hundred to about twelve-hundred microns in average diameter.

The coacervating agent may be a wax such as insect and animal waxes, vegetable waxes, mineral waxes, petroleum waxes, synthetic waxes, silicon waxes, or mixtures thereof. In the case of a mixture of waxes, the preferred mixture includes mineral wax and a silicone wax, and the mineral wax is ceresin wax while the silicone wax is stearoxy dimethicone. The polymer particles constitute from about ten to about fifty percent by weight of the composition, the active ingredient from about one to about eighty percent by weight of the composition, and the coacervating agent from about ten to about seventy percent by weight of the composition. The second predetermined average diameter of the coacervated particles is preferably in the range of from about two tenths of one millimeter to about five millimeters. The composition is ideal for incorporation into a polish formulation where application of the polish causes release of the active ingredient from the coacervated particles.

A precipitation polymerization process is used for producing the macroporous cross-linked polymer. In the process, there is polymerized at least one monounsaturated monomer and at least one polyunsaturated monomer in the presence of an organic liquid which is a solvent for and dissolves the monomers but not the polymer. The polymerization of the monomers is initiated by means of a free radical generating catalytic compound, precipitating a polymer in the solvent in the form of a powder. A dry powder is formed by removing the solvent from the precipitated polymeric powder.

The solvent is preferably isopropyl alcohol, although ethanol, toluene, heptane, xylene, hexane, ethyl alcohol, and cyclohexane, may also be employed. The monounsaturated monomer and the polyunsaturated monomer can be present in mol ratios of, for example, 20:80, 30:70, 40:60, or 50:50. The process includes the step of stirring the monomers, solvent, and the free radical generating catalytic compound, during polymerization. Preferably, the dry powder is formed by filtering excess solvent from the precipitated powder, and the filtered powder is vacuum dried. The powder may then be "post adsorbed" with various functional materials.

These and other objects, features, and advantages, of the present invention will become apparent when considered in light of the following detailed description, including the accompanying drawings.

As should be apparent from a consideration of FIGS. 1-3 and 5, the material is macroporous due to the complex arrangement of unit particles, agglomerates, and aggregates. As a result of this complex structure, the material possesses an inordinate amount of interstitial space and is a labyrinth of voids. Volatile ingredients entrapped within the void volume of the material are released by wicking to the surface and evaporate at a rate dependent upon such factors as temperature, vapor pressure, and surface area. Nonvolatile ingredients migrate to the surface by means of capillary action and are released on contact with another surface. Mechanical disruption may also be used to release the entrapped ingredient. The material is also capable of wicking ingredients from another surface and into itself thereby adsorbing ingredients to replace displaced ingredients. The material does not shrink or expand even though it is capable of adsorbing up to four times its own weight of an active ingredient. Since the process involved is adsorption in contrast to absorption, the properties of both the material and the active ingredient are not altered. Active ingredients are entrapped within the material in contrast to being encapsulated. Encapsulation connotes a complete enclosing of one material within another such as a shell forming around a core of liquid. Encapsulated ingredients can only be released by mechanical disruption of the shell or dissolution of the shell, and once the shell is disrupted the entire contents of the shell are extracted. With entrapment, however, the release of the ingredient may be controlled or sustained, and by such additional mechanisms as wicking, evaporation, and capillary action. In addition, with entrapment, the active ingredient is permitted a relatively unobstructed ingress and egress into and out of the labyrinth.

DETAILED DESCRIPTION OF THE INVENTION

The material of the present invention can be broadly and generally described as a crosslinked polymer capable of entrapping solids and liquids. The polymer is in particulate form and constitutes free flowing discrete solid particles even when loaded with an active ingredient. One polymer of the invention has the structural formula:

where the ratio of x to y is 80:20, R' is $-CH_2CH_2-$, and R'' is $-(CH_2)_{11}CH_3$.

The polymer material is highly crosslinked as evidenced by the foregoing structural formula, and is more particularly a highly crosslinked polymethacrylate polymer. This material is manufactured by the Dow Corning Corporation, Midland, Mich., U.S.A., and sold under the trademark POLYTRAP®. It is a low density, highly porous, free-flowing white particulate, and the particles are capable of adsorbing high levels of lipophilic liquids and some hydrophilic liquids, while at the same time maintaining a free-flowing particulate character.

In the powder form, the structure of the particulate is complex, and consists of unit particles less than one micron in average diameter. The unit particles are fused into agglomerates of twenty to eighty microns in average diameter. These agglomerates are loosely clustered into macro-particles termed aggregates of about 200 to about 1200 microns in average diameter.

Adsorption of active ingredients can be accomplished using a stainless steel mixing bowl and a spoon, wherein the active ingredient is added to the empty dry powder, and the spoon is used to gently fold the active into the powder. Low viscosity fluids may be adsorbed by addition of the fluids to a sealable vessel containing the powder and tumbling the materials until a consistency is achieved. More elaborate blending equipment such as ribbon or twin cone blenders can also be employed.

Figure 1:
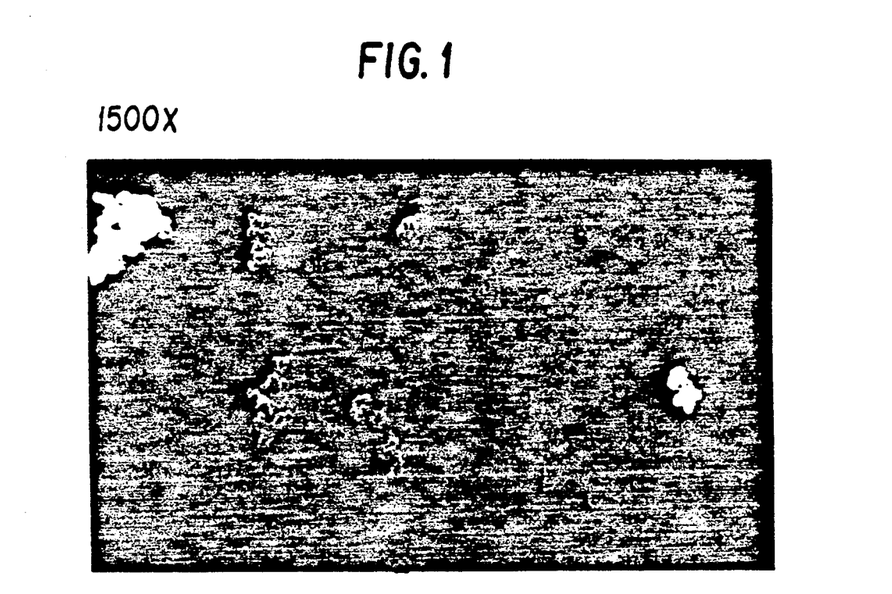
FIG. 1 is a photomicrograph of the components of the complex structure of the powder produced in Example I, and illustrating the unit particles, agglomeratures, and aggregates.
Figure 2:
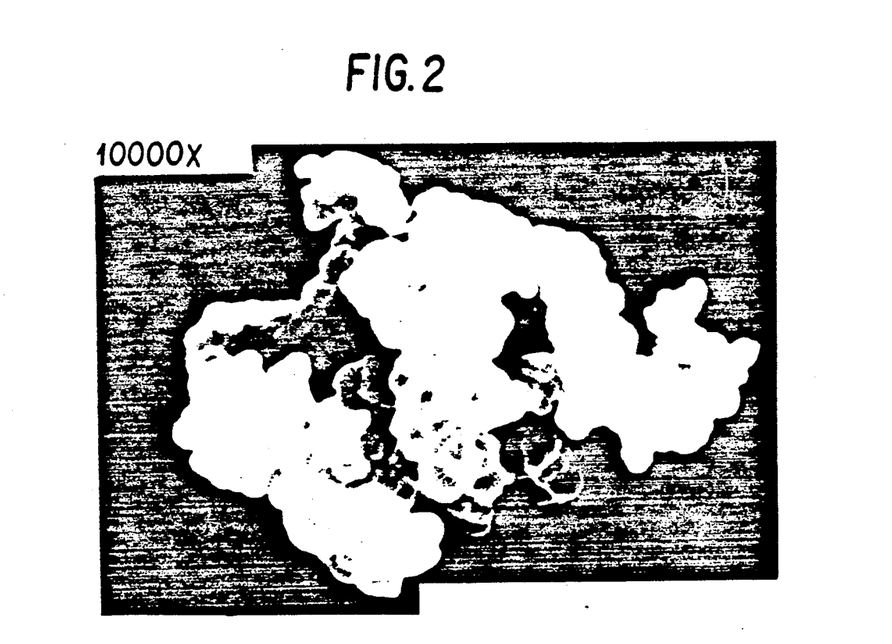
FIGS. 2 and 3 are photomicrographs of the agglomerates and aggregates of FIG. 1, respectively, shown on a larger scale.
Figure 3:
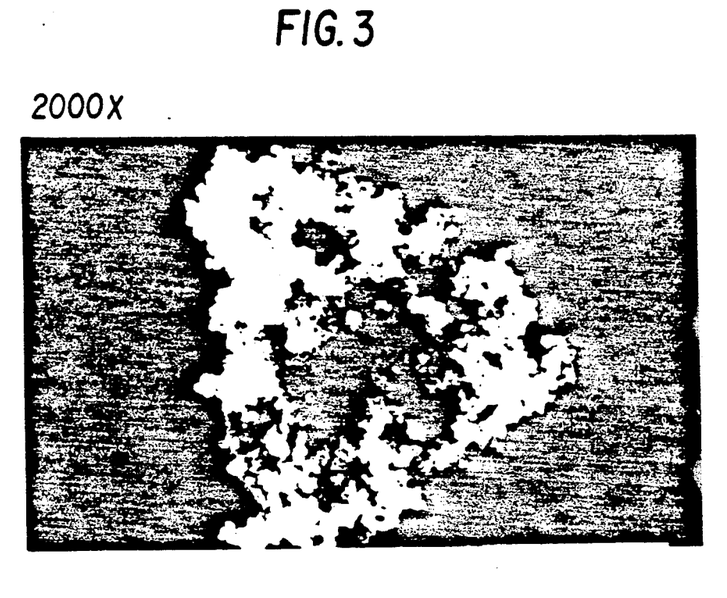

The following example illustrates the method for making an adsorbent powder of the type illustrated in FIGS. 1-3.

EXAMPLE I

A hydrophobic porous polymer was produced by precipitation polymerization by mixing in a five hundred milliliter reactor equipped with a paddle type stirrer, 13.63 grams of ethylene glycol dimethacrylate monomer, or eighty mole percent, and 4.37 grams of lauryl methacrylate monomer, or twenty mole percent. Isopropyl alcohol was added to the reactor as the solvent in the amount of 282 grams. The monomers were soluble in the solvent, but not the precipitated polymer. The process can be conducted with only polyunsaturated monomers if desired. The mixture including monomers, solvent, and 0.36 grams of catalytic initiator benzoyl peroxide was purged with nitrogen. The system was heated with a water bath to about sixty degrees Centigrade until polymerization was initiated, at which time the temperature was increased to about 70-75 degrees Centigrade for six hours in order to complete the polymerization. During this time, the polymer precipitated from the solution. The polymerization produced unit particles of a diameter less than about one micron. Some of the unit particles adhered together providing agglomerates of the order of magnitude of about twenty to eighty microns in diameter. Some of the agglomerates adhered and were fused and welded one to another, forming aggregates of loosely held assemblies of agglomerates of the order of magnitude of about two to eight hundred microns in diameter. The mixture was filtered to remove excess solvent and a wet powder cake was tray dried in a vacuum oven. A dry hydrophobic polymeric powder consisting of unit particles, agglomerates, and aggregates was isolated.

The method of Example I for the production of porous polymer particulate powder materials is characterized as a precipitation polymerization technique. In accordance with the technique, monomers are dissolved in a compatible volatile solvent in which both monomers are soluble. Polymer in the form of a powder is precipitated and the polymer is insoluble in the solvent. No surfactant or dispersing aid is required. The materials produced are powders and not spheres or beads. The powder particulates include unit particles, agglomerates, and aggregates. The volatile solvent is subsequently removed resulting in a dry powder, which can be post adsorbed with a variety of functional active ingredients.

The suspension polymerization process on the other hand, provides that polymerization be carried out in water, and in some cases chloroform or chlorinated solvents. The monomers, the active, and the catalyst, form beads or droplets in water, and polymerization occurs within each bead. A surfactant or stabilizer, such as polyvinyl pyrrolidone, is required in order to prevent the individually formed beads and droplets from coalescing. The resulting beads, with the active material entrapped therein, include a substantially spherical outer crust or shell, the interior of which contains a macroporous structure. The bead is about ten microns in average diameter to about one hundred-fifty microns, depending upon the rate of agitation employed during the process. Such beads are shown in FIGS. 4 and 5, and the process is set forth in Example III.

Figure 4:
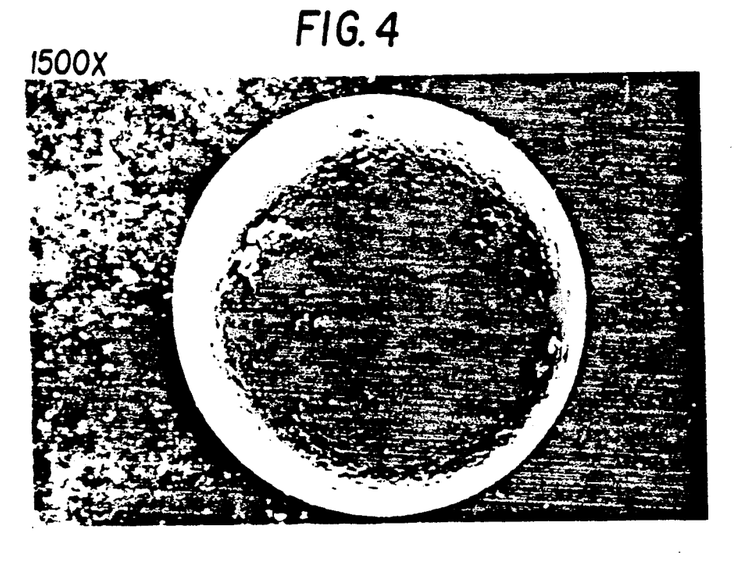
FIG. 4 is a photomicrograph of a polymer bead produced by suspension polymerization in Example III.
Figure 5:
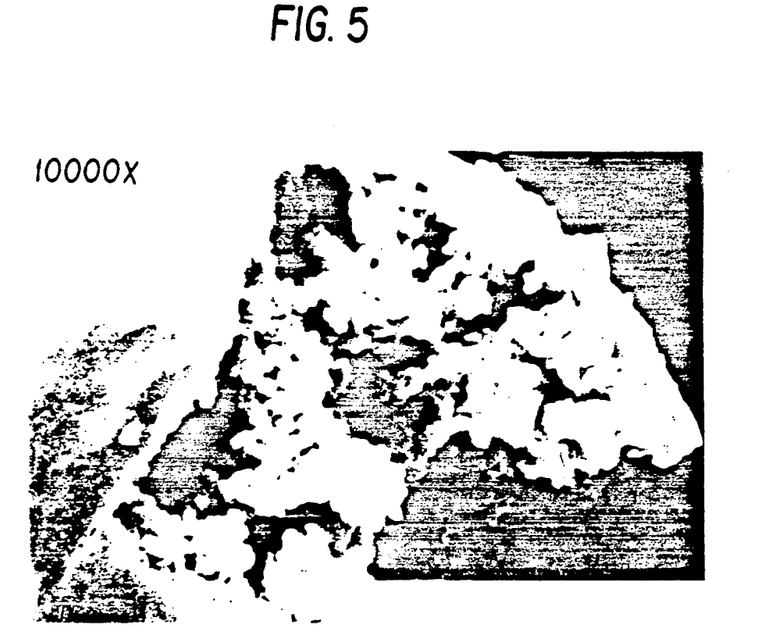
FIG. 5 is a photomicrograph of the bead of FIG. 4 with a portion of the shell removed to reveal the interior structure of the bead. Each figure indicates magnification.

Some unique features of the powder of Example I and FIGS. 1-3 and the bead of Example III and FIGS. 4 and 5 are their ability to adsorb liquids and yet remain free flowing. The materials provide a regulated release of ingredients entrapped therein, and have the capability of functioning as carriers. The powders disappear when rubbed upon a surface. This phenomenon is believed due to the fact that large aggregates of the material scatter light rendering the appearance of a white particulate, however, upon rubbing, these large aggregates decrease in size approaching the range of visible light and hence seem to disappear. The materials find applications in diverse areas such as cosmetics and toiletries, household and industrial products, pesticides, pheromone carriers, and pharmaceuticals.

The following example illustrates a precipitation polymerization process in which an organic ester is entrapped "in situ" in the polymer powder.

EXAMPLE II

Seven grams of 2-ethylhexyl oxystearate was mixed with 1.5 grams of ethylene glycol dimethacrylate and 1.5 grams of lauryl methacrylate in a glass test tube. The solution was deaerated for five minutes and 0.1 ml of t-butyl peroctoate was added and mixed while heating to 80 degrees Centigrade in an oil bath. After twenty minutes, the contents solidified and the mixture was maintained at about 80 degrees Centigrade for an additional hour to assure full polymerization. A heterogeneous white polymer resulted containing the entrapped ester.

The powder of Example I differs from the powder of Example II in that the solvent in Example I is removed resulting in a dry empty powder which is post adsorbed with other functional materials. The powder of Example II is polymerized "in situ" to contain a functional material but is otherwise similar to the material shown in FIGS. 1-3.

Example III illustrates a process for the production of beads as shown in FIGS. 4 and 5. The process is suspension polymerization and an organic ester is entrapped "in situ".

EXAMPLE III 1.20 grams of polyvinyl pyrrolidone was dissolved in 1500 ml of water in a 2000 ml three necked flask equipped with a stirrer, thermometer and nitrogen purge. A solution of 335 grams of 2-ethylhexyl oxystearate, 132 grams ethylene glycol dimethacrylate, 33 grams 2-ethylhexyl methacrylate, and 5 ml t-butyl peroctoate, was bubbled with nitrogen for 5 minutes. The resultant mix was slowly added to the stirred aqueous solution of polyvinyl pyrrolidone at 22 degrees Centigrade under nitrogen. The temperature was raised to 80 degrees Centigrade with constant agitation and held until polymerization started in approximately 15 minutes, and maintained at 80 degrees Centigrade for an additional 2 hours to complete the reaction. White beads were collected by filtering off the supernatant liquid and dried to remove any excess water. The beads weighed 450 g for a yield of 90%, and were 0.25 to 0.5 mm in diameter. Other protective colloids such as starch, polyvinyl alcohol, carboxymethyl cellulose, methyl cellulose, or inorganics such as divalent alkali metal hydroxides, for example MgOH, may be used in place of the polyvinyl pyrrolidone suspending medium.

In Example III macroporous polymers submicron in size are produced with two or more monomers, at least one monomer of which contains more than a single double bond. The polymerization is conducted in the presence of an active ingredient which does not dissolve or swell the resulting polymer. The monomers and the active ingredient are mutually soluble, but are insoluble in the aqueous suspending medium in which droplets are formed. Polymerization occurs within suspended droplets, and beads or spheres are produced. The active ingredient which is polymerized "in situ" is entrapped and contained within the beads, but the active ingredient is capable of being released. It is also possible to use a volatile liquid during polymerization, and to subsequently remove the volatile liquid, leaving behind a porous polymer bead product into which a variety of active materials can be subsequently adsorbed.

Examples of polyunsaturated monomers suitable for use in accordance with the present invention are ethylene glycol dimethacrylate, triethylene glycol dimethacrylate, tetraethylene glycol dimethacrylate, trimethylolpropane ethoxylated triacrylate, ditrimethylolpropane dimethacrylate; propylene, dipropylene and higher propylene glycols, 1,3 butylene glycol dimethacrylate, 1,4 butanediol dimethacrylate, 1,6 hexanediol dimethacrylate, neopentyl glycol dimethacrylate, pentaerythritol dimethacrylate, dipentaerythritol dimethacrylate, bisphenol A dimethacrylate, divinyl and trivinylbenzene, divinyl and trivinyltoluene, triallyl maleate, triallyl phosphate, diallyl maleate, diallyl itaconate, and allyl methacrylate. The monounsaturated monomers include allyl methacrylates and acrylates having straight or branched chain alkyl groups with 1 to 30 carbon atoms, preferably 5 to 18 carbon atoms. Preferred monomers include lauryl methacrylate, 2-ethylhexyl methacrylate, isodecylmethacrylate, stearyl methacrylate, hydroxyethyl methacrylate, hydroxypropyl methacrylate, diacetone acrylamide, phenoxyethyl methacrylate, tetrahydrofurfuryl methacrylate and methoxyethyl methacrylate. Many of the previously referred to patents also contain a detailed list of other suitable monomers that can be used.

EXAMPLE IV

Example I was repeated for each of a series of several monomer systems shown in Tables I-XIV. In each instance, submicron sized polymeric powders were produced employing a stirring speed of about seventy-five RPM. The catalyst was benzoyl peroxide. Adsorption capacities of the various polymeric powders for fluids were determined and are shown in the Tables, along with the mole ratios of monomers and the solvent. The abbreviations used in Tables I-XIV are identified as follows:

| | |
|---|---|
| DAA | Diacetone acrylamide |
| EGDM | Ethylene glycol dimethacrylate |
| TEGDM | Tetraethylene glycol dimethacrylate |
| ST | Styrene |
| DVB | Divinylbenzene |
| VP | Vinyl pyrrolidone |
| IBOMA | Isobornyl methacrylate |
| PEMA | Phenoxyethyl methacrylate |
| IDMA | Isodecyl methacrylate |
| STMA | Stearyl methacrylate |
| HPMA | Hydroxypropyl methacrylate |
| CYMA | Cyclohexyl methacrylate |
| DMAEMA | Dimethylaminoethyl methacrylate |
| TBAEMA | t-butyl aminoethyl methacrylate |
| AMPS | 2-acrylamido propane sulfonic acid |
| BMA | Butyl methacrylate |
| EHMA | 2-ethylhexyl methacrylate |
| MMA | Methyl methacrylate |
| HEMA | 2-hydroxyethyl methacrylate |
| EHO | 2-ethylhexyl oxystearate |
| GG | Glucose glutamate |
| IPA | Isopropyl alcohol |
| PEG | Polyethylene glycol 200 |

TABLE I

| Monomers | Mole Ratio | Solvent | Adsorption Capacity % | | | |
|---|---|---|---|---|---|---|
| | | | EHO | Glycerine | GG | Water |
| DAA/EGDM | 20/80 | Xylene | 75 | 82 | 83 | 78 |
| DAA/EGDM | 30/70 | Xylene | 77 | 80 | 83 | 78 |
| DAA/EGDM | 40/60 | Xylene | 75 | 75 | 83 | 77 |
| DAA/EGDM | 50/50 | Xylene | 50 | 57 | 67 | 0 |
| DAA/EGDM | 60/40 | Xylene | 40 | 40 | 50 | 0 |
| DAA/TEGDM | 20/80 | Xylene | 40 | 50 | 62 | 58 |
| DAA/TEGDM | 30/70 | Xylene | 29 | 40 | 50 | 55 |
| DAA/TEGDM | 40/60 | Xylene | 25 | 28 | 40 | 43 |
| DAA/TEGDM | 50/50 | Xylene | 25 | 30 | 40 | 43 |
| DAA/TEGDM | 60/40 | Xylene | 22 | 29 | 40 | 40 |

TABLE II

| Monomers | Mole Ratio | Solvent | Adsorption Capacity % | | | |
|---|---|---|---|---|---|---|
| | | | EHO | Glycerine | PEG | Water |
| ST/TEGDM | 20/80 | IPA | 58 | 69 | 69 | 67 |
| ST/TEGDM | 30/70 | IPA | 58 | 64 | 67 | 69 |
| ST/TEGDM | 40/60 | IPA | 62 | 71 | 71 | 61 |
| ST/TEGDM | 50/50 | IPA | 67 | 62 | 54 | 58 |
| ST/TEGDM | 60/40 | IPA | 50 | 58 | 58 | 54 |
| ST/TEGDM | 70/30 | IPA | 50 | 58 | 50 | 54 |
| ST/TEGDM | 80/20 | IPA | 44 | 54 | 50 | 50 |
| ST/DVB | 20/80 | IPA | 80 | 75 | 75 | 0 |
| ST/DVB | 30/70 | IPA | 75 | 67 | 75 | 0 |
| ST/DVB | 40/60 | IPA | 69 | 67 | 67 | 0 |
| ST/DVB | 50/50 | IPA | 64 | 72 | 67 | 0 |
| ST/DVB | 60/40 | IPA | 67 | 71 | 71 | 0 |
| ST/DVB | 70/30 | IPA | 71 | 75 | 76 | 0 |
| ST/DVB | 80/20 | IPA | 50 | 50 | 50 | 0 |

TABLE III

| Monomers | Mole Ratio | Solvent | Adsorption Capacity % | | | |
|---|---|---|---|---|---|---|
| | | | EHO | Glycerine | GG | Water |
| VP/EGDM | 20/80 | Xylene | 77 | 80 | 74 | 73.6 |
| VP/EGDM | 30/70 | Xylene | 76 | 79 | 78.3 | 70 |
| VP/EGDM | 40/60 | Xylene | 70 | 67 | 75.6 | 75 |
| VP/EGDM | 50/50 | Xylene | 72 | 76 | 80 | 76 |
| VP/EGDM | 60/40 | Xylene | 74 | 80 | 76 | 77 |
| VP/EGDM | 70/30 | IPA | 71 | 78 | 74 | 75 |
| VP/EGDM | 80/20 | IPA | 67 | 75 | 73 | 74 |
| VP/TEGDM | 20/80 | Xylene | 58 | 68.8 | 61.5 | 67.7 |
| VP/TEGDM | 30/70 | Xylene | 70 | 67 | 54.5 | 68.8 |
| VP/TEGDM | 40/60 | Xylene | 54.5 | 61.5 | 52.4 | 64.3 |
| VP/TEGDM | 50/50 | Xylene | 44.4 | 47.4 | 52.4 | 52.4 |
| VP/TEGDM | 60/40 | Xylene | 50 | 44.4 | 50 | 54.4 |
| VP/TEGDM | 70/30 | Xylene | 50 | 47.4 | 44.4 | 50 |
| VP/TEGDM | 80/20 | Xylene | 54.5 | 52.4 | 60 | 58 |

TABLE IV

| Monomers | Mole Ratio | Solvent | Adsorption Capacity % | | | |
|---|---|---|---|---|---|---|
| | | | EHO | Glycerine | GG | Water |
| IBOMA/EGDM | 20/80 | IPA | 62.9 | 9.1 | 71.4 | 0 |
| IBOMA/EGDM | 30/70 | IPA | 64.3 | 16.6 | 67.7 | 0 |
| IBOMA/EGDM | 40/60 | IPA | 68.7 | 28.6 | 61.5 | 0 |
| IBOMA/EGDM | 50/50 | IPA | 67.7 | 16.7 | 58.3 | 0 |
| IBOMA/EGDM | 60/40 | IPA | 50 | 23.1 | 50 | 0 |
| IBOMA/EGDM | 70/30 | IPA | 50 | 9.1 | 47.3 | 0 |
| IBOMA/EGDM | 80/20 | IPA | 52.3 | 16.6 | 44.4 | 0 |
| IBOMA/TEGDM | 20/80 | IPA | 66.6 | 62.9 | 61.5 | 0 |
| IBOMA/TEGDM | 30/70 | IPA | 61.5 | 61.5 | 70.6 | 0 |

TABLE IV-continued

| Monomers | Mole Ratio | Solvent | Adsorption Capacity % | | | |
|---|---|---|---|---|---|---|
| | | | EHO | Glycerine | GG | Water |
| IBOMA/TEGDM | 40/60 | IPA | 64.3 | 64.3 | 71.4 | 0 |
| IBOMA/TEGDM | 50/50 | IPA | 61.5 | 66.6 | 67.7 | 0 |
| IBOMA/TEGDM | 60/40 | IPA | 58.3 | 54.5 | 54.5 | 0 |
| IBOMA/TEGDM | 70/30 | IPA | 47.3 | 50 | 41.1 | 0 |
| IBOMA/TEGDM | 80/20 | IPA | 37.5 | 41.1 | 33.3 | 0 |

TABLE V

| Monomers | Mole Ratio | Solvent | Adsorption Capacity % | | | |
|---|---|---|---|---|---|---|
| | | | EHO | Glycerine | GG | Water |
| PEMA/EGDM | 20/80 | IPA | 64.3 | 68.7 | 66.6 | 61.5 |
| PEMA/EGDM | 30/70 | IPA | 54.5 | 50 | 54.5 | 44.4 |
| PEMA/EGDM | 40/60 | IPA | 52.3 | 47.3 | 72.2 | 9 |
| PEMA/EGDM | 50/50 | IPA | 54.5 | 33.3 | 62.9 | 0 |
| PEMA/EGDM | 60/40 | IPA | 67.7 | 28.5 | 70.5 | 0 |
| PEMA/EGDM | 70/30 | IPA | 69.7 | 44.4 | 60.7 | 0 |
| PEMA/EGDM | 80/20 | IPA | 66.6 | 68.7 | 66.6 | 0 |
| PEMA/TEGDM | 20/80 | IPA | 58.3 | 56.5 | 66.6 | 58.3 |
| PEMA/TEGDM | 30/70 | IPA | 64.2 | 70.5 | 67.7 | 62.9 |
| PEMA/TEGDM | 40/60 | IPA | 66.6 | 67.7 | 71.4 | 69.7 |
| PEMA/TEGDM | 50/50 | IPA | 66.6 | 70.5 | 73.6 | 72.2 |
| PEMA/TEGDM | 60/40 | IPA | 58.3 | 62.9 | 52.3 | 61.5 |
| PEMA/TEGDM | 70/30 | IPA | 50 | 58.3 | 52.3 | 54.5 |
| PEMA/TEGDM | 80/20 | IPA | 67.7 | 73.6 | 76.1 | 47.3 |

TABLE VI

| Monomers | Mole Ratio | Solvent | Adsorption Capacity % | | | |
|---|---|---|---|---|---|---|
| | | | EHO | Glycerine | PEG | Water |
| IDMA/EGDM | 20/80 | IPA | 55 | 64 | 70 | 0 |
| IDMA/EGDM | 30/70 | IPA | 38 | 50 | 44 | 0 |
| IDMA/EGDM | 40/60 | IPA | 50 | 67 | 69 | 0 |
| IDMA/EGDM | 50/50 | IPA | 58 | 64 | 67 | 0 |
| IDMA/EGDM | 60/40 | IPA | 58 | 69 | 69 | 0 |
| IDMA/TEGDM | 20/80 | IPA | 62 | 70 | 70 | 0 |
| IDMA/TEGDM | 30/70 | IPA | 50 | 62 | 62 | 0 |
| IDMA/TEGDM | 40/60 | IPA | 62 | 67 | 67 | 0 |
| IDMA/TEGDM | 50/50 | IPA | 38 | 44 | 50 | 0 |
| IDMA/TEGDM | 60/40 | IPA | 38 | 55 | 50 | 0 |

TABLE VII

| Monomers | Mole Ratio | Solvent | Adsorption Capacity % | | | |
|---|---|---|---|---|---|---|
| | | | EHO | Glycerine | PEG | Water |
| STMA/EGDM | 10/90 | IPA | 66 | 64.3 | 66.7 | 0 |
| STMA/EGDM | 20/80 | IPA | 69 | 63 | 65.5 | 0 |
| STMA/EGDM | 30/70 | IPA | 73–75 | 58.3 | 61.5 | 0 |
| STMA/EGDM | 40/60 | IPA | 69–71 | 54.5 | 58.3 | 0 |
| STMA/EGDM | 50/50 | IPA | 60–63 | 52.4 | 52.4 | 0 |
| STMA/TEGDM | 20/80 | IPA | 50 | 47.4 | 52.4 | 0 |
| STMA/TEGDM | 30/70 | IPA | 50 | 64.3 | 50 | 0 |
| STMA/TEGDM | 40/60 | IPA | 52.4 | 61.5 | 58.3 | 0 |
| STMA/TEGDM | 50/50 | IPA | 47.4 | 52.4 | 56.5 | 0 |

TABLE VIII

| Monomers | Mole Ratio | Solvent | Adsorption Capacity % | | | |
|---|---|---|---|---|---|---|
| | | | EHO | Glycerine | PEG | Water |
| HPMA/EGDM | 20/80 | Xylene | 64.3 | 61.5 | 61.5 | 9 |
| HPMA/EGDM | 30/70 | Xylene | 54.5 | 16.7 | 58.3 | 0 |
| HPMA/EGDM | 40/60 | Xylene | 54.5 | 9 | 58.3 | 0 |
| HPMA/EGDM | 50/50 | Xylene | 37.5 | 58.3 | 50 | 0 |
| HPMA/EGDM | 60/40 | Xylene | 44.4 | 61.5 | 58.3 | 0 |
| HPMA/EGDM | 70/30 | Xylene | 50 | 44.4 | 37.5 | 0 |
| HPMA/EGDM | 80/20 | Xylene | 61.5 | 16.7 | 58.3 | 0 |
| HPMA/TEGDM | 20/80 | Xylene | 50 | 58.3 | 54.5 | 61.5 |
| HPMA/TEGDM | 30/70 | Xylene | 56.5 | 54.5 | 50 | 60 |
| HPMA/TEGDM | 40/60 | Xylene | 50 | 58.3 | 52.4 | 54.5 |
| HPMA/TEGDM | 50/50 | Xylene | 52.4 | 61.5 | 54.5 | 56.5 |
| HPMA/TEGDM | 60/40 | Xylene | 33.3 | 47.4 | 44.4 | 54.5 |
| HPMA/TEGDM | 70/30 | Xylene | 54.5 | 44.4 | 54.5 | 50 |

TABLE VIII-continued

| Monomers | Mole Ratio | Solvent | Adsorption Capacity % | | | |
|---|---|---|---|---|---|---|
| | | | EHO | Glycerine | PEG | Water |
| HPMA/TEGDM | 80/20 | Xylene | 50 | 47.4 | 41.2 | 37.5 |

TABLE IX

| Monomers | Mole Ratio | Solvent | Adsorption Capacity % | | | |
|---|---|---|---|---|---|---|
| | | | EHO | Glycerine | PEG | Water |
| CYMA/EGDM | 80/20 | IPA | 61.5 | 71.4 | 66.6 | 0 |
| CYMA/EGDM | 70/30 | IPA | 60 | 66 | 64.2 | 0 |
| CYMA/EGDM | 60/40 | IPA | 61.5 | 66 | 66.6 | 0 |
| CYMA/EGDM | 50/50 | IPA | 64.2 | 66 | 68.7 | 0 |
| CYMA/EGDM | 40/60 | IPA | 64.2 | 66 | 68.7 | 0 |
| CYMA/EGDM | 30/70 | IPA | 61.5 | 66 | 66.6 | 0 |
| CYMA/EGDM | 20/80 | IPA | 66.6 | 71.4 | 75 | 61.5 |
| CYMA/TEGDM | 80/20 | IPA | 68.7 | 0 | 68.7 | 0 |
| CYMA/TEGDM | 70/30 | IPA | 71.4 | 0 | 69.7 | 0 |
| CYMA/TEGDM | 60/40 | IPA | 66.6 | 0 | 62.9 | 0 |
| CYMA/TEGDM | 50/50 | IPA | | 0 | | 0 |
| CYMA/TEGDM | 40/60 | IPA | 60 | 0 | 72.9 | 0 |
| CYMA/TEGDM | 30/70 | IPA | 64.2 | 0 | 72.2 | 0 |
| CYMA/TEGDM | 20/80 | IPA | 61.5 | 0 | 66.6 | 0 |

TABLE X

| Monomers | Mole Ratio | Solvent | Adsorption Capacity % | | | |
|---|---|---|---|---|---|---|
| | | | Water | Mineral Oil | Glycerine | EHO |
| DMAEMA/EGDM | 20/80 | Hexane | 0 | 58.3 | 66.7 | 58.3 |
| DMAEMA/EGDM | 40/60 | Hexane | 66.7 | 61.5 | 70.6 | 66.7 |
| DMAEMA/EGDM | 60/40 | Hexane | 77.3 | 61.5 | 72.2 | 76.2 |
| DMAEMA/EGDM | 80/20 | Hexane | 66.7 | 58.3 | 68.8 | 58.3 |
| TBAEMA/EGDM | 20/80 | Hexane | 0 | 70.6 | 75 | 70.6 |
| TBAEMA/EGDM | 40/60 | Hexane | 0 | 66.7 | 72.2 | 66.7 |
| TBAEMA/EGDM | 60/40 | Hexane | 0 | 61.5 | 68.75 | 61.5 |
| TBAEMA/EGDM | 80/20 | Hexane | 0 | 44.4 | 54.6 | 50 |
| TBAEMA/EGDM | 80/20 | Hexane | 54.6 | 54.6 | 58.3 | 50 |

TABLE XI

| Monomers | Mole Ratio | Solvent | Adsorption Capacity % | | | |
|---|---|---|---|---|---|---|
| | | | Water | Mineral Oil | Glycerine | EHO |
| AMPS/EGDM | 20/80 | Xylene | 84.3 | 83.3 | 85.3 | 83.3 |
| BMA/EGDM | 20/80 | Hexane | 0 | 70.6 | 75 | 68.8 |
| BMA/EGDM | 40/60 | Hexane | 0 | 70.6 | 77.3 | 70.6 |
| BMA/EGDM | 40/60 | Ethyl-Alcohol | 0 | 66.7 | 73.7 | 68.8 |
| BMA/EGDM | 60/40 | Hexane | 0 | 72.2 | 0 | 73.7 |
| BMA/EGDM | 80/20 | Hexane | 0 | 54.5 | 66.7 | 58.3 |

TABLE XII

| Monomers | Mole Ratio | Solvent | Adsorption Capacity % | | | |
|---|---|---|---|---|---|---|
| | | | Water | Mineral Oil | Glycerine | EHO |
| 2 EHMA/EGDM | 20/80 | IPA | 0 | 68.8 | 66.7 | 64.3 |
| 2 EHMA/EGDM | 30/70 | IPA | 0 | 68.8 | 66.7 | 64.3 |
| 2 EHMA/EGDM | 40/60 | IPA | 0 | 66.7 | 66.7 | 70.6 |
| 2 EHMA/EGDM | 50/50 | IPA | 0 | 64.3 | 68.3 | 61.5 |
| 2 EHMA/EGDM | 60/40 | IPA | 0 | 61.5 | 64.3 | 50 |
| 2 EHMA/EGDM | 70/30 | IPA | 0 | 58.3 | 64.3 | 50 |
| 2 EHMA/EGDM | 80/20 | IPA | 0 | 58.3 | 64.3 | 50 |

TABLE XIII

| Monomers | Mole Ratio | Solvent | Adsorption Capacity % | | | |
|---|---|---|---|---|---|---|
| | | | Water | Mineral Oil | Glycerine | EHO |
| MMA/EGDM | 20/80 | IPA | 61.5 | 58.3 | 64.3 | 58.3 |
| MMA/EGDM | 30/70 | IPA | 64.3 | 61.5 | 66.7 | 61.5 |
| MMA/EGDM | 40/60 | IPA | 61.5 | 64.3 | 64.3 | 61.5 |
| MMA/EGDM | 50/50 | IPA | 58.3 | 54.5 | 61.5 | 58.3 |
| MMA/EGDM | 60/40 | IPA | 54.5 | 50 | 61.5 | 54.5 |
| MMA/EGDM | 70/30 | IPA | 66.7 | 61.5 | 72.2 | 64.3 |

TABLE XIII-continued

| Monomers | Mole Ratio | Solvent | Adsorption Capacity % | | | |
|---|---|---|---|---|---|---|
| | | | Water | Mineral Oil | Glycerine | EHO |
| MMA/EGDM | 80/20 | IPA | 66.7 | 44.4 | 78.3 | 44.4 |

TABLE XIV

| Monomers | Mole Ratio | Solvent | Adsorption Capacity % | | | |
|---|---|---|---|---|---|---|
| | | | Water | PEG | Glycerine | EHO |
| HEMA/EGDM | 20/80 | IPA | 54.5 | 54.5 | 54.5 | 50 |
| HEMA/EGDM | 30/70 | IPA | 58.3 | 64.3 | 58.3 | 54.5 |
| HEMA/EGDM | 40/60 | IPA | 58.3 | 61.5 | 64.3 | 54.5 |
| HEMA/EGDM | 50/50 | IPA | 61.5 | 61.5 | 61.5 | 50 |
| HEMA/EGDM | 60/40 | IPA | 61.5 | 64.3 | 61.5 | 50 |
| HEMA/EGDM | 70/30 | IPA | 58.3 | 64.3 | 58.3 | 50 |
| HEMA/EGDM | 80/20 | IPA | 61.5 | 58.3 | 61.5 | 54.5 |

As noted above, highly crosslinked polymeric systems consisting of particles of submicron size can be prepared from monomers having at least two polymerizable unsaturated bonds and containing no comonomers having monounsaturated moiety.

The waxes which can be employed in the polish formulations of this invention are well known to those skilled in the art and will vary depending on the specific use intended for the polish and the properties being sought. Specific examples of suitable waxes include animal waxes such as beeswax, spermaceti, lanolin and shellac wax; vegetable waxes such as carnauba, candelilla, bayberry, and sugarcane; mineral waxes such as ozocerite, ceresin, montan, paraffin, microcrystalline and petrolatum; and synthetic waxes such as ethylenic polymers, polyol ether-esters and chlorinated naphthalenes.

The abrasives which can be used in the polish formulations of this invention are well known to those skilled in the art and the particular abrasive will depend on the nature of the surface to be polished and the results desired. Specific examples of suitable abrasives include aluminum silicate, diatomaceous earth, pumice, Fuller's earth, bentonite, silicas, tripoli, hydrated calcium silicate, chalk, colloidal clay, magnesium oxide, red iron oxide, and tin oxide.

Also there is commonly employed in polish formulations solvents such as V.M.&P. naphtha, Stoddard solvent, naphtha, mineral spirits, water, kerosene; surfactants such as polyoxyethylene sorbitan monooleate, and fatty alcohol amine sulfate; thickening agents such as hectorite and montmurillonite clays, soya lecithin, and methyl cellulose; detergent resistant additives such as aminofunctional and carboxyfunctional silicones; colorants, odorants, corrosion inhibitors and other ingredients normally used in making polishes. Such ingredients are well known to the skilled artisan and hence are only mentioned to the above extent for the sake of brevity.

It should be noted that this invention is applicable to all forms of wax and/or abrasive containing polishes which includes solvent based polishes, water based emulsion polishes and paste wax polishes.

The detergent resistant additives are organic polysiloxanes which are film formers having a viscosity in the range of about 5 to as high as several million centistokes, preferably about 100 to about 10,000 centistokes. More preferably, a mixture of polysiloxanes having relatively higher and relatively lower viscosities is employed. Such polysiloxanes have the repeating unit wherein n is an integer having a value greater than 1, $R^1$ is an alkyl radical containing 1 to 7 carbon atoms, inclusive, or a phenyl group, $R^2$ is hydrogen, an alkyl radical containing 1 to 7 carbon atoms, inclusive, or a phenyl group. Illustrative polysiloxanes encompassed by the above formula are polydimethylsiloxane, polydiethylsiloxane, polymethylethyl siloxane, polymethylphenylsiloxane, polydiphenylsiloxanes, diphenylsilanediol, and copolymers of two or more of the foregoing siloxanes. Polysiloxane-oxyalkylene block copolymers may also be utilized. In addition to the aforementioned organic polysiloxanes, the present compositions may also include an aminofunctional polysiloxane as well as a silane. The amino-functional polysiloxane is a silicone fluid with highly polar pendant aminoalkyl modifying groups that enhance the durability of the film formed by the polysiloxanes present and promotes adhesion of the formed film to a wide variety of substrates.

Particularly preferred aminofunctional polysiloxanes include reactive and non-reactive hydrolyzable and non-hydrolyzable derivatives which are wholly, or in part, terminally substituted with aminopropyl, aminobutyl, or diamino pendant chains. As stated above, the present composition also contemplates an optional, but preferred, liquid silane constituent, which promotes the mutual solubility of the other organic silicone compounds present in the mixture utilized by the present compositions. Suitable liquid silanes are represented by the formula $R_3$—Si(OR$^4$)$_3$ wherein $R^3$ can be an alkyl radical containing one to three carbon atoms, inclusive or phenyl, and $R_4$ can be an alkyl radical containing one or two carbon atoms, inclusive. A preferred liquid silane constituent is an alkyl trialkoxysilane such as methyltrimethoxysilane, ethyltriethoxysilane, phenyltrimethoxysilane, phenyltriethoxysilane, and the like.

The aminofunctional siloxane compositions of the present invention may be represented by the following formula:

Me₃SiO(Me₂SiO)ₓ(MeSiO)ᵧSiMe₃    (I)
|
CH₂CH(CH₃)CH₂NHCH₂CH₂NH₂

Such compositions are described in more or less detail in U.S. Pat. No. 3,508,933, issued Apr. 28, 1970, in U.S. Pat. No. 3,836,371, issued Sep. 17, 1974, and in U.S. Pat. No. 3,890,271, issued Jun. 17, 1975. The preparation of these compositions and their use in polishes is also detailed in the aforementioned patents, the disclosures of which are incorporated herein by reference thereto. Particular of such compositions prepared and falling within the scope of the present invention is set forth in Table XV.

TABLE XV

| Compound (I) | x | y |
|---|---|---|
| A | 45.75 | 2.25 |
| B | 69.25 | 3.75 |
| C | 96 | 2 |
| D | 188 | 10 |
| E | 295.9 | 2.1 |
| F | 400 | 8 |

The aminofunctional siloxanes of the formula (I) type may also be prepared by an alternate method from that set forth in U.S. Pat. No. 3,508,933, U.S. Pat. No. 3,836,371, and U.S. Pat. No. 3,890,271, aforementioned. In the alternate method, the starting material is methyldimethoxy ethylenediaminoisobutyl silane of the formula:

CH₃(CH₃O)₂SiCH₂CH(CH₃)CH₂NHCH₂CH₂NH₂

This aminofunctional silane is distilled to an active concentration of between about 95-99%. The silane is hydrolyzed with three moles of water added to one mole of the silane. The material is batch distilled at atmospheric pressure and at a temperature of about one hundred and thirty degrees centigrade. Methanol and residual water are then removed by vacuum stripping to yield an aminofunctional hydrolyzate. The aminofunctional hydrolyzate is added to a mixture of polydimethylsiloxane of viscosity of 1.5 centistokes, a dimethylcyclic of the formula (Me₂SiO)ₙ where n is three, four, or five, and a catalyst such as potassium hydroxide or potassium silanolate. This mixture is equilibrated to a polymer by agitation and heat at about one hundred-fifty degrees centigrade. The mixture is cooled to about 80–90 degrees centigrade or lower and the catalyst is neutralized by the addition of acetic acid accompanied with mixing. The non-volatile content is increased by stripping of the volatiles under vacuum, followed by filtration of the material in a pre-coated plate and frame filter for the purpose of removing any haze in order to obtain a clarified product. A typical example of this procedure is set forth below.

EXAMPLE V

Into a round bottom flask was added 3,482.8 grams of a dimethylcyclic, 439.2 grams of hydrolyzate, 78.4 grams of polydimethylsiloxane of viscosity of 1.5 cs, and 38.3 grams of potassium silanolate catalyst. The contents of the flask were mixed under a nitrogen atmosphere for twenty minutes. Heat was applied to the flask and the contents were maintained at one hundred-fifty degrees centigrade for four hours. The mixture was cooled to thirty-three degrees centigrade. The catalyst was neutralized by the addition to the flask of 2.14 grams of acetic acid. The fluid was stirred overnight and filtered. The resulting product was water clear and had a viscosity of 354 cs. The product contained five mol percent amine and was identified as the material set forth in Table XV where x = 188 and y = 10.

The preferred aminofunctional siloxane is selected from the group consisting of (A) a blend or reaction product of a hydroxyl endblocked polydimethylsiloxane having a viscosity in the range of about 10 to 15,000 cs at twenty-five degrees centigrade, and a silane selected from the group consisting of those having the general formulae R″ₙ(R′O)₃₋ₙSi(CH₂)₃NHR‴ and R″ₙ(R′O)₃₋ₙSiRNHCH₂CH₂NH₂ wherein R‴ is a hydrogen atom or a methyl radical, R″ is a monovalent hydrocarbon radical free of aliphatic unsaturation and contains from one to six carbon atoms, n has a value of from zero to two, R′ is an alkyl radical containing from one to four carbon atoms, and R is a divalent hydrocarbon radical free of aliphatic unsaturation and contains three to four carbon atoms, (B) a blend or reaction product of a hydroxyl endblocked polydimethylsiloxane having a viscosity in the range of about 10 to 15,000 cs at twenty-five degrees centigrade, a silane selected from the group consisting of those having the general formulae (R₁O)₃—SiR₂NHR₃ and (R₁O)₃—SiR₂NHCH₂CH₂NH₂ wherein R₁ is an alkyl radical containing from one to four carbon atoms, R₂ is a divalent hydrocarbon radical free of aliphatic unsaturation and contains from three to four carbon atoms, and R₃ is selected from the group consisting of the hydrogen atom and the methyl radical, and a silane having the general formula X₃SiZ wherein X is selected from the group consisting of alkoxy and acyloxy radicals containing from one to four carbon atoms, and Z is a nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a blend or reaction product of a polydimethylsiloxane having a viscosity in the range of about one to 15,000 cs at twenty-five degrees centigrade, and a silane selected from the group consisting of those having the general formulae R″ₙ(R′O)₃₋ₙSi(CH₂)₃NHR‴ and R‴ₙ(R′O)₃₋ₙSiRNHCH₂CH₂NH₂ wherein R‴ is a hydrogen atom or a methyl radical, R″ is a monovalent hydrocarbon radical free of aliphatic unsaturation and contains from one to six carbon atoms, n has a value of from zero to two, R′ is an alkyl radical containing from one to four carbon atoms, and R is a divalent hydrocarbon radical free of aliphatic unsaturation and contains three to four carbon atoms. (C) above is a specific species and a trimethylsilyl endblocked aminofunctional siloxane produced by incorporating conventional trimethylsilyl functional silanes or siloxanes into the aminofunctional siloxanes.

The amine functional siloxane polymer also has the formula

R₃₋zʹQzSiO[R₂ʹSiO]ₓ[RʹQSiO]ᵧSiQzR₃₋zʹ wherein R′ denotes an alkyl group of 1 to 4 carbons, OH, an alkoxy group, or a phenyl group, with the proviso that at least 50 percent of the total R′ groups are methyl; Q denotes an amine functional substituent of the formula —R″Z, wherein R″ is a divalent alkylene radical of 3 to 6 carbon atoms or a radical of the formula —CH$_2$CH$_2$CH$_2$OCH$_2$—CHOHCH$_2$— and Z is a monovalent radical selected from the group consisting of —NR$_2'''$, —NR'''(CH$_2$)$_n$NR$_2'''$; and $$NR'''(CH_2)_nN(R''')\overset{O}{\overset{\|}{C}}R''''$$

wherein R''' denotes hydrogen or an alkyl group of 1 to 4 carbons, R'''' denotes an alkyl group of 1 to 4 carbons and n is a positive integer from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of x.

For purposes of the present invention, the term "coacervate" and "coacervating agent" is intended to define a material which causes particles of a first predetermined size to collect and form in denser clusters of particles of an increased size. For example, active ingredients are initially entrapped in the powder of FIGS. 1-3 forming particles in the range of 200-1200 microns. These particles containing the entrapped active ingredient are mixed with a coacervating agent to form larger particles in excess of twelve hundred microns. The preferred range of the coacervated particle size is from about 0.2-5.0 millimeters in average diameter. A preferable range is 0.4-2.0 millimeters, although the particles can be larger if desired. Similarly, active ingredients are first entrapped in the bead form of the invention as shown in FIGS. 4 and 5 forming particles in the range of 10-150 microns. These particles containing the entrapped active ingredient are mixed with a coacervating agent to form larger particles in excess of one hundred-fifty microns.

Typical of the coacervating agents which may be employed in accordance with the present invention are waxes, gums, resins, polymers, starches, and elastomers. Exemplary of waxes are insect and animal waxes such as beeswax and spermaceti; vegetable waxes such as candelilla, carnauba, Japan wax, Ouricury, Douglas-fir bark wax, rice-bran wax, jojoba, castor wax, and bayberry wax; mineral waxes such as montan wax, peat waxes, ozokerite, and ceresin; petroleum waxes such as paraffin wax; synthetic waxes such as polyethylene waxes, Fischer-Tropsch waxes, chemically modified hydrocarbon waxes, substituted amide waxes; and silicone wax. Reference may be had to U.S. Pat. No. 3,395,169, issued Jul. 30, 1968, describing a silicone wax which is an organosilicon block copolymer; and U.S. Pat. No. 3,563,941, issued Feb. 16, 1971, describing a silicone-carnauba wax copolymer; and each patent is incorporated herein by reference. In addition, the coacervating agent may include wax-like solids such as cetyl alcohol; gums such as cellulosic gums and alignate gums; polymers such as polyvinyl alcohol; and resins such as polyvinylpyrrolidone.

Thus, in accordance with the present invention there is provided macroporous polymer particles entrapping an active ingredient, which particles are in turn formed into other particles which are held together or coacervated by a coacervating agent. The coacervated particles find application especially in polish formulations where the function of the coacervated particles is to prevent exposure of the active ingredient to moisture. In addition, the coacervated particles are capable of releasing the active ingredient when the polish is applied. In a particular application, an active ingredient such as a reactive aminofunctional silicone is loaded and entrapped into a macroporous polymer and coacervated to form larger particles. Depending upon the nature of the coacervant selected, the coacervated particles rub out easily upon application to a surface releasing the active ingredient. While the macroporous particles themselves possess an inherent protecting function with respect to the active ingredient by virtue of entrapping the active ingredient therein, the coacervating agent also functions in protecting the active ingredient when coacervated particles containing the active ingredient are dispersed in vehicles that would under normal circumstances leach out the active ingredient from the macroporous polymer or otherwise render it unsuitable.

The following additional examples further illustrate the concepts of the present invention.

EXAMPLE VI

Seven parts by weight of an amine functional siloxane having at least one reactive group on silicon and corresponding to the organosilicon compounds described above were placed in a bottle with ten parts by weight of an isoparaffinic solvent manufactured and sold under the trademark ISOPAR® L by Exxon Company, U.S.A., Houston, Tex. The bottle was shaken in order to obtain a blend. It is noted that the solvent can be any aliphatic hydrocarbon having a kauri-butanol value of less than about thirty-eight such as mineral spirits and kerosene. In addition, the solvent may be any isoparaffinic solvent such as branched chain aliphatic hydrocarbons with 11-13 carbon atoms in the alkyl chain.

EXAMPLE VII

Sixteen parts by weight of the powder of Example I was placed in a stainless steel mixing bowl. Forty-two parts by weight of the blend of Example VI was poured on top of the dry powder. The mixture was slowly folded together with a spoon. A portion of the powder having the blend entrapped therein was applied to an ASTM painted black enamel panel and rubbed. There was produced a good gloss on the panel and the powder was easy to apply.

EXAMPLE VIII

Three liters of water was placed in a six liter vessel and heated to eighty degrees Centigrade. One hundred grams of melted cetyl alcohol was added to the vessel under high agitation. Agitation was continued in order to uniformly disperse the wax-like cetyl alcohol. The powder from Example VII was slowly sprinkled into the vortex of the vessel contents and agitation was maintained for one minute. Heating of the vessel was discontinued and two liters of cold water was added to the vessel while maintaining agitation. The agitation was stopped and the water was decanted from the vessel to collect the coacervated powder material having the amine functional siloxane entrapped therein. The powder material was spread evenly on a tray and dried at about thirty-two degrees Centigrade. A portion of the coacervated powder was applied to an ASTM painted black enamel panel and rubbed. There was produced a good gloss on the panel and the coacervated powder was easy to apply.

EXAMPLE IX

Ten parts by weight of a three percent solution of a thickening agent sold under the trademark CARBOPOL® 934 was mixed with 52.5 parts by weight of water in a container. The thickening agent is a cross-linked acrylic acid polymer manufactured by B. F. Goodrich Chemical Group, Cleveland, Ohio. The contents of the container were mixed until uniform, and thirty parts by weight of the coacervated powder of Example VIII was added to the container. 7.5 parts by weight of triethanolamine was added to the container in order to activate the thickening and the contents of the container were mixed producing a thickened liquid formulation. Paste formulations were prepared by employing additional amounts of the thickening agent. A portion of the liquid formulation was applied to a clean ASTM painted black enamel panel and to a dark glass pane and rubbed. There was produced a good gloss on the panel and pane. The liquid formulation was easy to apply and produced a uniform film. Very light buffing was applied.

The following examples illustrate anhydrous systems of the present invention.

EXAMPLE X

Seven parts by weight of an amine functional siloxane having at least one reactive group on silicon and corresponding to the organosilicon compounds described above were placed in a bottle with ten parts by weight of mineral spirits. The bottle was shaken in order to obtain a blend.

EXAMPLE XI

Twenty parts by weight of the powder of Example I was placed in a stainless steel mixing bowl. Thirty parts by weight of the blend of Example X was poured on top of the dry powder. The mixture was slowly folded together with a spoon.

EXAMPLE XII

Three parts by weight of a thickening agent sold under the trademark BENTONE® 38 was mixed with 86.5 parts by weight of mineral spirits in a container. The thickening agent is a hectorite clay manufactured by National Lead Co., Charleston, W. Va. The contents of the container were mixed until uniform, and ten parts by weight of the powder of Example XI was added to the container. One and one-half parts by weight of anhydrous isopropanol was added to the container in order to activate the thickening and the contents of the container were mixed producing a thickened soft paste polish formulation. A portion of the soft paste polish was applied to a clean Ford, black, clear coat enamel paint panel and to a dark tinted glass surface and rubbed. The soft paste polish was also applied to a black, enamel, clear coated 1988 Corvette. There was produced a good to excellent gloss. The formulation was easy to apply and produced a streak free surface, without buffing.

The foregoing examples indicate that the powder delivery system of the present invention provides a metered level of an active ingredient without the necessity of buffing. While either aqueous or anhydrous formulations may be used as shown in Examples IX and XII respectively, the anhydrous formulation has been found to provide better cleaning in addition to the other benefits noted.

The polish compositions of the present invention possess unique advantages over prior art formulations. For example, it is known that reactive amine functional siloxanes are sensitive to moisture contamination to the point of forming gels. Therefore, polish systems containing such siloxanes are difficult to emulsify in certain oil in water emulsions with fugitive emulsifiers, and stability and viscosity control problems are frequently encountered. Such difficulties, however, are overcome with the present invention in that there is provided an entrapment of the reactive siloxanes within a porous polymer thus protecting them from the damaging effects of gellation that is typically encountered in the prior art. Further protection is also offered in accordance with the present invention by coacervating the porous polymer particles which contain the entrapped reactive amine functional siloxanes. Further, the polish may be applied as a "dry brite" or "one rag" polish, and rubbed into the surface without the necessity of buffing the surface thereafter.

It should be noted that the polish formulations of this invention may also include volatile low viscosity silicone fluids such as polydimethylcyclosiloxane and hexamethyldisiloxane. Such fluids have viscosities measured at twenty-five degrees Centigrade of from about 0.65 to about 5.0 centistokes. These volatile fluids have the formula $(CH_3)_2SiO_x$ in which x is an integer from three to eight. The fluids may also include mixtures of tetramers and pentamers, for example. It has been found that the polish formulations of the present invention possess the advantage in that the polish is easier to apply, the rub out is much improved, and the appearance of the polished surface can be enhanced in comparison to conventional and prior art polish formulations which do not contain macroporous polymers.

The polishes of the present invention are of general application including such surfaces as motor vehicles, boats and navigable crafts, wood surfaces, plastic surfaces, and fiber surfaces. The films produce a high gloss, are durable, and are easy to apply.

It will be apparent from the foregoing that many other variations and modifications may be made in the compounds, compositions, and methods described herein without departing substantially from the essential features and concepts of the present invention. Accordingly, it should be clearly understood that the forms of the invention described herein are exemplary only and are not intended as limitations of the scope on the present invention.

That which is claimed is:

1. In a polish formulation containing as components thereof at least one component selected from the group consisting of waxes, film forming ingredients, solvents, surfactants, thickening agents, abrasives, dyes, odorants, and other ingredients normally used in making polishes, the improvement comprising incorporating into the polish formulation a macroporous highly cross-linked polymer, the polymer having entrapped therein an amine functional siloxane.

2. The polish of claim 1 in which the amine functional siloxane has at least one reactive group on silicon.

3. The polish of claim 2 in which the reactive group is selected from the group consisting of alkoxy groups and hydroxy groups.

4. The polish of claim 1 which is in the form of a liquid.

5. The polish of claim 1 which is in the form of a paste.

6. The polish of claim 1 in which the amine functional siloxane is selected from the group consisting of (A) a combination of a hydroxyl endblocked polydimethylsiloxane having a viscosity in the range of about 10 to 15,000 cs at twenty-five degrees centigrade, and a silane selected from the group consisting of those having the general formulae $R''_n(R'O)_{3-n}Si(CH_2)_3NHR'''$ and $R'''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms, (B) a combination of a hydroxyl endblocked polydimethylsiloxane having a viscosity in the range of about 10 to 15,000 cs at twenty-five degrees centigrade, a silane selected from the group consisting of those having the general formulae $(R_1O)_3—SiR_2NHR_3$ and $(R_1O)_3—SiR_2NHCH_2CH_2NH_2$ wherein $R_1$ is an alkyl radical containing from one to four carbon atoms, $R_2$ is a divalent hydrocarbon radical free of aliphatic unsaturation and contains from three to four carbon atoms, and $R_3$ is selected from the group consisting of the hydrogen atom and the methyl radical, and a silane having the general formula $X_3SiZ$ wherein X is selected from the group consisting of alkoxy and acyloxy radicals containing from one to four carbon atoms, and Z is a nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a combination of a polydimethylsiloxane having a viscosity in the range of about one to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms.

7. The polish of claim 1 in which the amine functional siloxane has the formula $R_{3-z'}Q_zSiO[R_2'SiO]_x[R'QSiO]_ySiQ_zR_{3-z'}$ wherein $R'$ denotes OH, alkoxy, an alkyl group of 1 to 4 carbons, or a phenyl group, with the proviso that at least 50 percent of the total $R'$ groups are methyl; Q denotes an amine functional substituent of the formula —R''Z, wherein $R''$ is a divalent alkylene radical of 3 to 6 carbon atoms or a radical of the formula —CH$_2$CH$_2$CH$_2$OCH$_2$—CHOHCH$_2$— and Z is a monovalent radical selected from the group consisting of —NR$_2'''$, —NR'''(CH$_2$)$_n$NR$_2'''$; and NR'''(CH$_2$)$_n$N(R''')CR'''' wherein R''' denotes hydrogen or an alkyl group of 1 to 4 carbons, R'''' denotes an alkyl group of 1 to 4 carbons and n is a positive integer from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of X.

8. The polish of claim 1 including discrete particles of the highly cross-linked macroporous polymer, the particles being of a first predetermined average diameter, the polymer particles having entrapped therein and dispersed uniformly throughout the siloxane, and a coacervating agent mixed with the polymer particles in an amount sufficient to cause the polymer particles to collect forming dense clusters of coacervated particles of a second predetermined average diameter, the second predetermined average diameter being substantially in excess of the first predetermined average diameter.

9. The polish of claim 8 wherein the polymer is hydrophobic and is formed of at least one polyunsaturated monomer.

10. The polish of claim 9 wherein the polyunsaturated monomer is selected from the group consisting of ethylene glycol dimethacrylate and tetraethylene glycol dimethacrylate.

11. The polish of claim 8 wherein the polymer is hydrophobic and is formed of at least one monounsaturated monomer and at least one polyunsaturated monomer.

12. The polish of claim 11 wherein the monounsaturated monomer is selected from the group consisting of lauryl methacrylate and 2-ethylhexyl methacrylate, and the polyunsaturated monomer is selected from the group consisting of ethylene glycol dimethacrylate and tetraethylene glycol dimethacrylate.

13. The polish of claim 8 in which the particles of the first predetermined average diameter include unit particles of less than about one micron in average diameter, agglomerates of fused unit particles of sizes in the range of about twenty to eighty microns in average diameter, and aggregates of clusters of fused agglomerates of sizes in the range of about two-hundred to about twelve-hundred microns in average diameter.

14. The polish of claim 13 in which the polymer is a polymethacrylate.

15. The polish of claim 8 in which the coacervating agent is a wax-like solid.

16. The polish of claim 15 in which the coacervating agent is cetyl alcohol.

17. The polish of claim 8 in which the coacervating agent is a wax selected from the group consisting of insect and animal waxes, vegetable waxes, mineral waxes, petroleum waxes, synthetic waxes, and silicone waxes.

18. A method of polishing a surface comprising applying to the surface a polish formulation including a macroporous highly crosslinked polymer, the polymer having entrapped therein an amine functional siloxane, and rubbing the formulation into the surface.

19. The method of claim 18 in which the amine functional siloxane has at least one reactive group on silicon.

20. The method of claim 19 in which the reactive group is selected from the group consisting of alkoxy groups and hydroxy groups.

21. The method of claim 18 which is in the form of a liquid.

22. The method of claim 18 which is in the form of a paste.

23. The method of claim 18 in which the amine functional siloxane is selected from the group consisting of (A) a combination of a hydroxyl endblocked polydimethylsiloxane having a viscosity in the range of about 10 to 15,000 cs at twenty-five degrees centigrade, and a silane selected from the group consisting of those having the general formulae $R''_n(R'O)_{3-n}Si(CH_2)_3NHR'''$ and $R'''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms, (B) a combination of a hydroxyl endblocked polydimethylsiloxane having a viscosity in the range of about 10 to 15,000 cs at twenty-five degrees centigrade, a silane selected from the group consisting of those having the general formulae $(R_1O)_3-SiR_2NHR_3$ and $(R_1O)_3-SiR_2NHCH_2CH_2NH_2$ wherein $R_1$ is an alkyl radical containing from one to four carbon atoms, $R_2$ is a divalent hydrocarbon radical free of aliphatic unsaturation and contains from three to four carbon atoms, and $R_3$ is selected from the group consisting of the hydrogen atom and the methyl radical, and a silane having the general formula $X_3SiZ$ wherein X is selected from the group consisting of alkoxy and acyloxy radicals containing from one to four carbon atoms, and Z is a nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a combination of a polydimethylsiloxane having a viscosity in the range of about one to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms.

24. The method of claim 18 in which the amine functional siloxane has the formula wherein $R'$ denotes OH, alkoxy, an alkyl group of 1 to 4 carbons or a phenyl group, with the proviso that at least 50 percent of the total $R'$ groups are methyl; Q denotes an amine functional substituent of the formula —R"Z, wherein R" is a divalent alkylene radical of 3 to 6 carbon atoms or a radical of the formula —CH$_2$CH$_2$C-H$_2$OCH$_2$—CHOHCH$_2$— and Z is a monovalent radical selected from the group consisting of —NR$_2'''$, —NR'''(CH$_2$)$_n$NR$_2'''$; and wherein R''' denotes hydrogen or an alkyl group of 1 to 4 carbons, R'''' denotes an alkyl group of 1 to 4 carbons and n is a positive integer from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of X.

25. The method of claim 18 including discrete particles of the highly cross-linked macroporous polymer, the particles being of a first predetermined average diameter, the polymer particles having entrapped therein and dispersed uniformly throughout the siloxane, and a coacervating agent mixed with the polymer particles in an amount sufficient to cause the polymer particles to collect forming dense clusters of coacervated particles of a second predetermined average diameter, the second predetermined average diameter being substantially in excess of the first predetermined average diameter.

26. The method of claim 18 wherein the polymer is hydrophobic and is formed of at least one polyunsaturated monomer.

27. The method of claim 26 wherein the polyunsaturated monomer is selected from the group consisting of ethylene glycol dimethacrylate and tetraethylene glycol dimethacrylate.

28. The method of claim 18 wherein the polymer is hydrophobic and is formed of at least one monounsaturated monomer and at least one polyunsaturated monomer.

29. The method of claim 28 wherein the monounsaturated monomer is selected from the group consisting of lauryl methacrylate and 2-ethylhexyl methacrylate, and the polyunsaturated monomer is selected from the group consisting of ethylene glycol dimethacrylate and tetraethylene glycol dimethacrylate.

30. The method of claim 25 in which the particles of the first predetermined average diameter include unit particles of less than about one micron in average diameter, agglomerates of fused unit particles of sizes in the range of about twenty to eighty microns in average diameter, and aggregates of clusters of fused agglomerates of sizes in the range of about two-hundred to about twelve-hundred microns in average diameter.

31. The method of claim 30 in which the polymer is a polymethacrylate.

32. The method of claim 25 in which the coacervating agent is a wax-like solid.

33. The method of claim 32 in which the coacervating agent is cetyl alcohol.

34. The method of claim 25 in which the coacervating agent is a wax selected from the group consisting of insect and animal waxes, vegetable waxes, mineral waxes, petroleum waxes, synthetic waxes, and silicone waxes.

35. A composition comprising discrete particles of a highly cross-linked macroporous polymer, the particles being of a first predetermined average diameter, the polymer particles having entrapped therein and dispersed uniformly throughout an amine functional siloxane, and a coacervating agent mixed with the polymer particles in an amount sufficient to cause the polymer particles to collect forming dense clusters of coacervated particles of a second predetermined average diameter, the second predetermined average diameter being substantially in excess of the first predetermined average diameter.

36. The composition of claim 35 wherein the polymer is hydrophobic and is formed of at least one polyunsaturated monomer.

37. The composition of claim 36 wherein the polyunsaturated monomer is selected from the group consisting of ethylene glycol dimethacrylate and tetraethylene glycol dimethacrylate.

38. The composition of claim 35 wherein the polymer is hydrophobic and is formed of at least one monounsaturated monomer and at least one polyunsaturated monomer.

39. The composition of claim 38 wherein the monounsaturated monomer is selected from the group consisting of lauryl methacrylate and 2-ethylhexyl methacrylate, and the polyunsaturated monomer is selected from the group consisting of ethylene glycol dimethacrylate and tetraethylene glycol dimethacrylate.

40. The composition of claim 35 in which the particles of the first predetermined average diameter are in the form of a bead.

41. The composition of claim 40 in which the particles of the first predetermined average diameter which are in the form of a bead have an average diameter of about ten microns to about one hundred-fifty microns.

42. The composition of claim 35 in which the particles of the first predetermined average diameter include unit particles of less than about one micron in average diameter, agglomerates of fused unit particles of sizes in the range of about twenty to eighty microns in average diameter, and aggregates of clusters of fused agglomerates of sizes in the range of about two-hundred to about twelve-hundred microns in average diameter.

43. The composition of claim 42 in which the polymer is a polymethacrylate.

44. The composition of claim 35 in which the amine functional siloxane has at least one reactive group on silicon.

45. The composition of claim 44 in which the reactive group is selected from the group consisting of alkoxy groups and hydroxy groups.

46. The composition of claim 35 which is in the form of a liquid.

47. The composition of claim 35 which is in the form of a paste.

48. The composition of claim 35 which the amine functional siloxane is selected from the group consisting of (A) a combination of a hydroxyl endblocked polydimethylsiloxane having a viscosity in the range of about 10 to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms, (B) a combination of a hydroxyl endblocked polydimethylsiloxane having a viscosity in the range of about 10 to 15,000 cs at twenty-five degrees centigrade, a silane selected from the group consisting of those having the general formulae $(R_1O)_3$—$SiR_2NHR_3$ and $(R_1O)_3$—$SiR_2NHCH_2CH_2NH_2$ wherein $R_1$ is an alkyl radical containing from one to four carbon atoms, $R_2$ is a divalent hydrocarbon radical free of aliphatic unsaturation and contains from three to four carbon atoms, and $R_3$ is selected from the group consisting of the hydrogen atom and the methyl radical, and a silane having the general formula $X_3SiZ$ wherein X is selected from the group consisting of alkoxy and acyloxy radicals containing from one to four carbon atoms, and Z is a nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a combination of a polydimethylsiloxane having a viscosity in the range of about one to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms.

49. The composition of claim 35 in which the amine functional siloxane has the formula wherein $R'$ denotes OH, alkoxy, an alkyl group of 1 to 4 carbons or a phenyl group, with the proviso that at least 50 percent of the total $R'$ groups are methyl; Q denotes an amine functional substituent of the formula—$R''Z$, wherein $R''$ is a divalent alkylene radical of 3 to 6 carbon atoms or a radical of the formula —$CH_2CH_2CH_2OCH_2$—$CHOHCH_2$— and Z is a monovalent radical selected from the group consisting of —$NR_2'''$, —$NR'''(CH_2)_nNR_2'''$; and wherein $R'''$ denotes hydrogen or an alkyl group of 1 to 4 carbons, $R''''$ denotes an alkyl group of 1 to 4 carbons and n is a positive integer from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of X.

50. The composition of claim 35 in which the coacervating agent is a wax-like solid.

51. The composition of claim 50 in which the coacervating agent is cetyl alcohol.

52. The composition of claim 35 in which the coacervating agent is a wax selected from the group consisting of insect and animal waxes, vegetable waxes, mineral waxes, petroleum waxes, synthetic waxes, and silicone waxes.

* * * * *